(12) United States Patent
Ishiba

(10) Patent No.: US 8,041,471 B2
(45) Date of Patent: Oct. 18, 2011

(54) VERTICAL TAKE-OFF AND LANDING AIRCRAFT AND VERTICAL TAKE-OFF AND LANDING AIRCRAFT CONTROL METHOD

(75) Inventor: Masatsugu Ishiba, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1008 days.

(21) Appl. No.: 11/979,978

(22) Filed: Nov. 13, 2007

(65) Prior Publication Data
US 2008/0114505 A1 May 15, 2008

(30) Foreign Application Priority Data
Nov. 13, 2006 (JP) ................................. 2006-307067

(51) Int. Cl.
*G05D 1/00* (2006.01)
*B64C 29/00* (2006.01)

(52) U.S. Cl. ............. 701/8; 701/3; 701/4; 701/5; 701/7; 701/10; 244/17.11; 244/17.13; 244/17.15; 244/17.23

(58) Field of Classification Search ............ 701/3, 4, 701/5, 7, 8, 9, 10; 244/12.1, 12.2, 12.3, 12.4, 244/17.11, 17.13, 17.15, 17.23
See application file for complete search history.

(56) References Cited

U.S. PATENT DOCUMENTS

| | | | | |
|---|---|---|---|---|
| 4,709,882 A | * | 12/1987 | Galbraith | 244/53 R |
| 4,740,899 A | * | 4/1988 | McElreath | 701/3 |
| 4,783,023 A | * | 11/1988 | Jupe | 244/6 |
| 5,082,079 A | | 1/1992 | Lissaman et al. | |
| 6,007,298 A | * | 12/1999 | Karem | 416/44 |
| 6,260,796 B1 | | 7/2001 | Klingensmith | |
| 6,316,895 B1 | * | 11/2001 | Ramarathnam | 318/400.02 |
| 6,641,365 B2 | * | 11/2003 | Karem | 416/1 |
| 6,892,980 B2 | * | 5/2005 | Kawai | 244/12.4 |

(Continued)

FOREIGN PATENT DOCUMENTS

JP   7-222478   8/1995

(Continued)

OTHER PUBLICATIONS

JP Office Action dated Sep. 3, 2008.

*Primary Examiner* — Thomas Black
*Assistant Examiner* — Peter D Nolan
(74) *Attorney, Agent, or Firm* — Finnegan, Henderson, Farabow, Garrett & Dunner, LLP

(57) ABSTRACT

A vertical take-off and landing aircraft that includes AC motors, which drive fans that propel the aircraft, and a control device for controlling the AC motors adaptively based on a thrust control amount from an attitude controller. In particular, the drive controller performs switching to convert DC from a power source to three-phase AC at a predetermined frequency to be supplied to the AC motors. The drive controller reduces the control frequency of the three-phase AC to be applied to the AC motor to reduce the control resolution when the flight mode is switched from a vertical flight control mode to a horizontal flight control mode, in which the control amount to correct the external forces is smaller. Therefore, it is possible to reduce the power loss in the controller and thus the power consumption compared to conventional vertical take-off and landing aircrafts, in which the control resolution is always constant.

5 Claims, 7 Drawing Sheets

U.S. PATENT DOCUMENTS 7,296,767 B2 * 11/2007 Palcic et al. ................ 244/17.11
7,364,115 B2 * 4/2008 Parks et al. ................ 244/12.4

FOREIGN PATENT DOCUMENTS

| | | |
|---|---|---|
| JP | 2003-180095 | 6/2003 |
| JP | 2005-502540 | 1/2005 |
| JP | 2005-125976 | 5/2005 |
| JP | 2005-319970 | 11/2005 |
| JP | 2007-55372 | 3/2007 |
| WO | WO 03/024790 | 3/2003 |

* cited by examiner

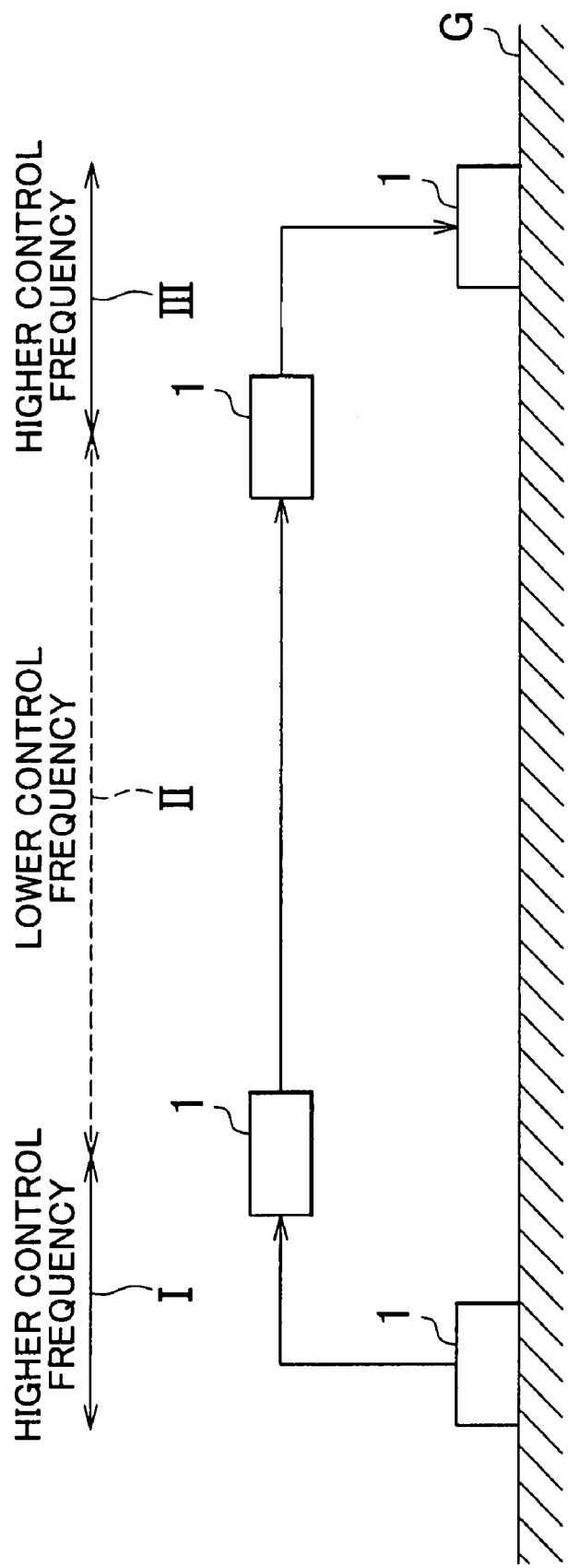

VERTICAL TAKE-OFF AND LANDING AIRCRAFT AND VERTICAL TAKE-OFF AND LANDING AIRCRAFT CONTROL METHOD

INCORPORATION BY REFERENCE

The disclosure of Japanese Patent Application No. 2006-307067 filed on Nov. 13, 2006 including the specification, drawings and abstract is incorporated herein by reference in its entirety.

BACKGROUND OF THE INVENTION

1. Field of the Invention

The present invention relates to a vertical take-off and landing aircraft, and more particularly to a vertical take-off and landing aircraft propelled by an electric fan and a vertical take-off and landing aircraft control method.

2. Description of the Related Art

Flying devices propelled by electric fans have been proposed as vertical take-off and landing aircrafts (VTOLs). Japanese Patent Application Publication No. 2005-125976 (JP-A-2005-125976), for example, describes a flying device that achieves increased craft body stability and thus improved safety during flights with the operator's seat surface positioned below the rotation plane of the fans and with a drive source for driving the fans disposed under the operator's seat surface so that the gravity center of the flying device is suspended from above by the thrust of the fans disposed at the front and rear of the craft body during flights.

The above vertical take-off and landing aircraft requires a power source such as a battery for electrically driving the fans. However, the power source such as a battery can supply only a limited amount of electricity, which unfavorably restricts the flight duration of the vertical take-off and landing aircraft. Therefore, vertical take-off and landing aircrafts with longer flight durations have been desired.

SUMMARY OF THE INVENTION

The present invention provides a vertical take-off and landing (VTOL) aircraft with reduced power consumption.

A first aspect of the present invention provides a VTOL aircraft that includes: a fan for propelling the vertical take-off and landing aircraft; a driving device for electrically driving the fan; and a control device for controlling the driving device adaptively in response to an external force, in which the control device reduces the control resolution of a control amount that is applied to the driving device as the control amount to correct the external force decreases.

With this configuration, the control device reduces the control resolution of the control amount that is applied to the driving device, as the control amount to correct the external forces decreases. Therefore, it is possible to reduce the power loss in the control device and thus the power consumption in comparison to conventional VTOL aircraft, in which the control resolution is always constant.

In addition, the control device may reduce the control resolution of the control amount to be applied to the driving device, as a speed component perpendicular to a ground surface is small relative to a speed component parallel to the ground surface.

The control amount to correct the external forces is large during vertical take-off and landing, in which the speed component perpendicular to the ground surface is large relative to the speed component parallel to the ground surface, and is small during level flight, in which the speed component perpendicular to the ground surface is small relative to the speed component parallel to the ground surface. With this configuration, since the control device reduces the control resolution of the control amount to be applied to the driving device as a shift is made to level flying, where the control amount is smaller and thus the required control response is slower. As a result, the power consumption can be reduced without compromising the control response required for flying.

In addition, the control device may be selectively operable in a horizontal flight control mode to be selected when the speed component parallel to the ground surface is larger than the speed component perpendicular to the ground surface, or a vertical flight control mode to be selected when the speed component parallel to the ground surface is equal to or smaller than the speed component perpendicular to the ground surface or to be selected when the aircraft is stationary in air; and when switching is made from the vertical flight control mode to the horizontal flight control mode, the control device may reduce the control resolution of the control amount to be applied to the driving device compared to that in the vertical flight control mode.

With this configuration, the control device is selectively operable in the vertical flight control mode in which a faster control response is required or the horizontal flight control mode in which a slower control response is acceptable. When the flight control mode is switched from the vertical flight control mode to the horizontal flight control mode, the control resolution of the control amount to be applied to the driving device is reduced compared to that in the vertical flight control mode, and therefore it is possible to reduce the power consumption without compromising the control response required for flying.

On the other hand, the control device may be selectively operable in a horizontal flight control mode to be selected when the speed component parallel to the ground surface is greater than the speed component perpendicular to the ground surface, or a vertical flight control mode to be selected when the speed component parallel to the ground surface is equal to or smaller than the speed component perpendicular to the ground surface or to be selected when the aircraft is stationary in air; and when the flight control mode is switched from the horizontal flight control mode to the vertical flight control mode, the control device may increase the control resolution of the control amount to be applied to the driving device compared to that in the horizontal flight control mode.

With this configuration, the control device is selectively operable in the vertical flight control mode, in which a faster control response is required, or the horizontal flight control mode, in which a slower control response is acceptable. When the flight control mode is switched from the horizontal flight control mode to the vertical flight mode, the control resolution of the control amount that is applied to the driving device is increased compared to that in the horizontal flight control mode, and therefore it is possible to secure the control response required for flying, and to improve the stability at the time of vertical take-off and landing.

When it is unidentifiable to which of the horizontal flight control mode and the vertical flight control mode switching has been made, the control device may assume that switching has been made from the horizontal flight control mode to the vertical flight control mode to increase the control resolution of the control amount applied to the driving device compared to that in the horizontal flight control mode.

With this configuration, when it is unidentifiable to which of the horizontal flight control mode and the vertical flight control mode switching has been made, the control device assumes that switching has been made from the horizontal flight control mode to the vertical flight control mode to increase the control resolution of the control amount that is applied to the driving device compared to that in the horizontal flight control mode. Therefore, preparation can be made for emergency landing or the like, for which a faster control response is required, at the time of such a malfunction, when the current flight control mode cannot be identified.

When a device provided in a craft body malfunctions, the control device may assume that switching has been made from the horizontal flight control mode to the vertical flight control mode to increase the control resolution of the control amount applied to the driving device compared to that in the horizontal flight control mode.

With this configuration, when any device provided in the craft body malfunctions, the control device assumes that switching has been made from the horizontal flight control mode to the vertical flight control mode to increase the control resolution of the control amount applied to the driving device compared to that in the horizontal flight control mode. Therefore, preparation can be made for emergency landing or the like, for which a faster control response is required, at the time of such a malfunction, when a device provided in the craft body has malfunctioned.

When the speed component parallel to the ground surface is equal to or larger than the speed component perpendicular to the ground surface, the control device may reduce the control resolution of the control amount to be applied to the driving device, as an amount of air that comes from sides of the craft body is smaller.

With this configuration, when the speed component parallel to the ground surface is equal to or larger than the speed component perpendicular to the ground surface, the control device reduces the control resolution of the control amount that is applied to the driving device as the amount of air that comes from sides of the craft body decreases. Therefore, it is possible to avoid performing unnecessary control, and thus to reduce the power consumption, when there are fewer external disturbances due to crosswinds.

Further, the control resolution of the control amount to be applied to the driving device by the control device may be a control frequency of the control amount to be applied to the driving device.

With this configuration, the control device can change the control resolution to change the power consumption in the control device by changing the control frequency.

A second aspect of the present invention provides a VTOL aircraft control method that includes: identifying an external force that acts on a VTOL aircraft; determining a control amount adaptively in response to the external force; and controlling an electric fan for propelling the VTOL aircraft using the control amount, in which as the control amount determined adaptively to the external force is reduced, a control resolution of the control amount is also reduced.

With this configuration, the control device reduces the control resolution of the control amount to be applied to the driving device as the control amount to correct external forces decreases. Therefore, it is possible to reduce the power loss in the control device and, accordingly, the power consumption in comparison to conventional VTOL aircraft, in which the control resolution is always constant.

With the vertical take-off and landing aircraft of the present invention, the power consumption can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 3 is a diagram showing the operation, from take-off to landing, of the vertical take-off and landing aircraft in accordance with the embodiment of the present invention;

DETAILED DESCRIPTION OF THE EMBODIMENTS

Hereinafter a vertical take-off and landing aircraft in accordance with an embodiment of the present invention will be described with reference to the accompanying drawings.

Figure 1:
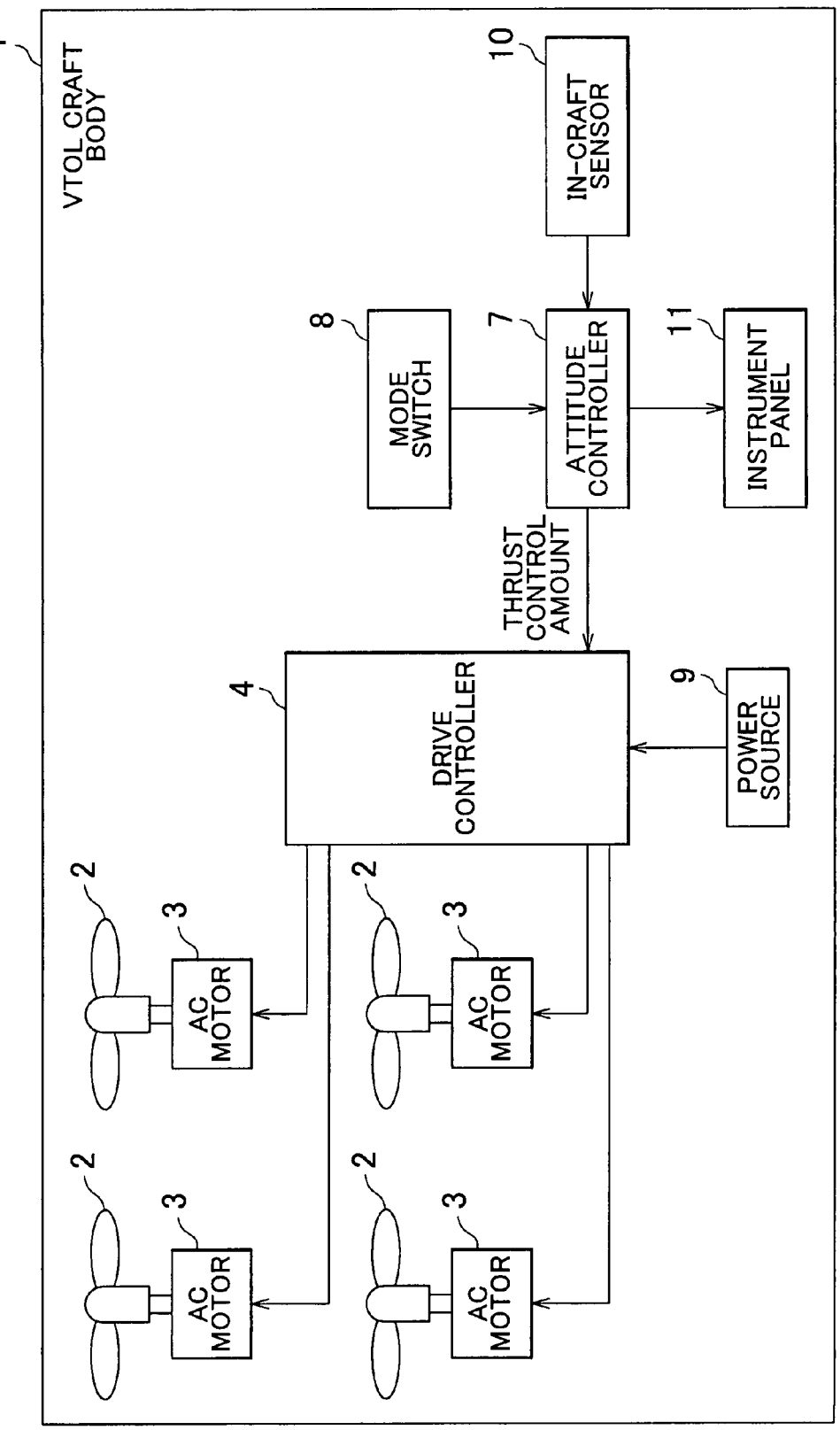
FIG. 1 is a block diagram showing a vertical take-off and landing aircraft in accordance with an embodiment of the present invention.

FIG. 1 is a block diagram showing a vertical take-off and landing (VTOL) aircraft in accordance with an embodiment of the present invention. The VTOL aircraft of this embodiment flies in a vertical flight mode in which the aircraft vertically can take off from and land on the ground, or in a horizontal flight mode in which the aircraft flies parallel to the ground surface. As shown in FIG. 1, the VTOL aircraft of this embodiment includes a VTOL craft body 1, four fans 2 that generate thrust, and four AC motors (driving devices) 3 that drive the respective fans 2. The AC motors 3 are each connected to a drive controller (control device) 4 to receive three-phase AC at any frequency from the drive controller 4 so as to be driven at any speed.

The drive controller 4 functions as a DC/AC converter, and performs switching, based on a thrust control amount from an attitude controller 7, to convert DC from a power source 9, such as a battery, to three-phase AC at a predetermined frequency to be supplied to the AC motors 3.

The attitude controller 7 outputs a predetermined thrust control amount, to be described later, to the drive controller 4 based on a flight mode switching signal from a flight mode switch 8 when switching between the vertical flight mode (hovering mode) and the horizontal flight mode. The attitude controller 7 outputs a predetermined thrust control amount to the drive controller 4 when a flight-mode switching signal from the flight mode switch 8 is not detected, as well.

An in-craft sensor 10 provided in the VTOL craft body 1 is connected to the attitude controller 7. The attitude controller 7 acquires information that indicates whether any device provided in the craft body is malfunctioning and information of the magnitude of crosswinds, body rolls and so forth from the in-craft sensor 10 and outputs a thrust control amount in accordance with such information to the drive controller 4.

An instrument panel 11 that displays the information to an operator is connected to the attitude controller 4. The instrument panel 11 notifies the operator when the flight-mode switching signal from the flight mode switch 8 cannot be detected and when any device provided in the craft body is malfunctioning.

Figure 2:
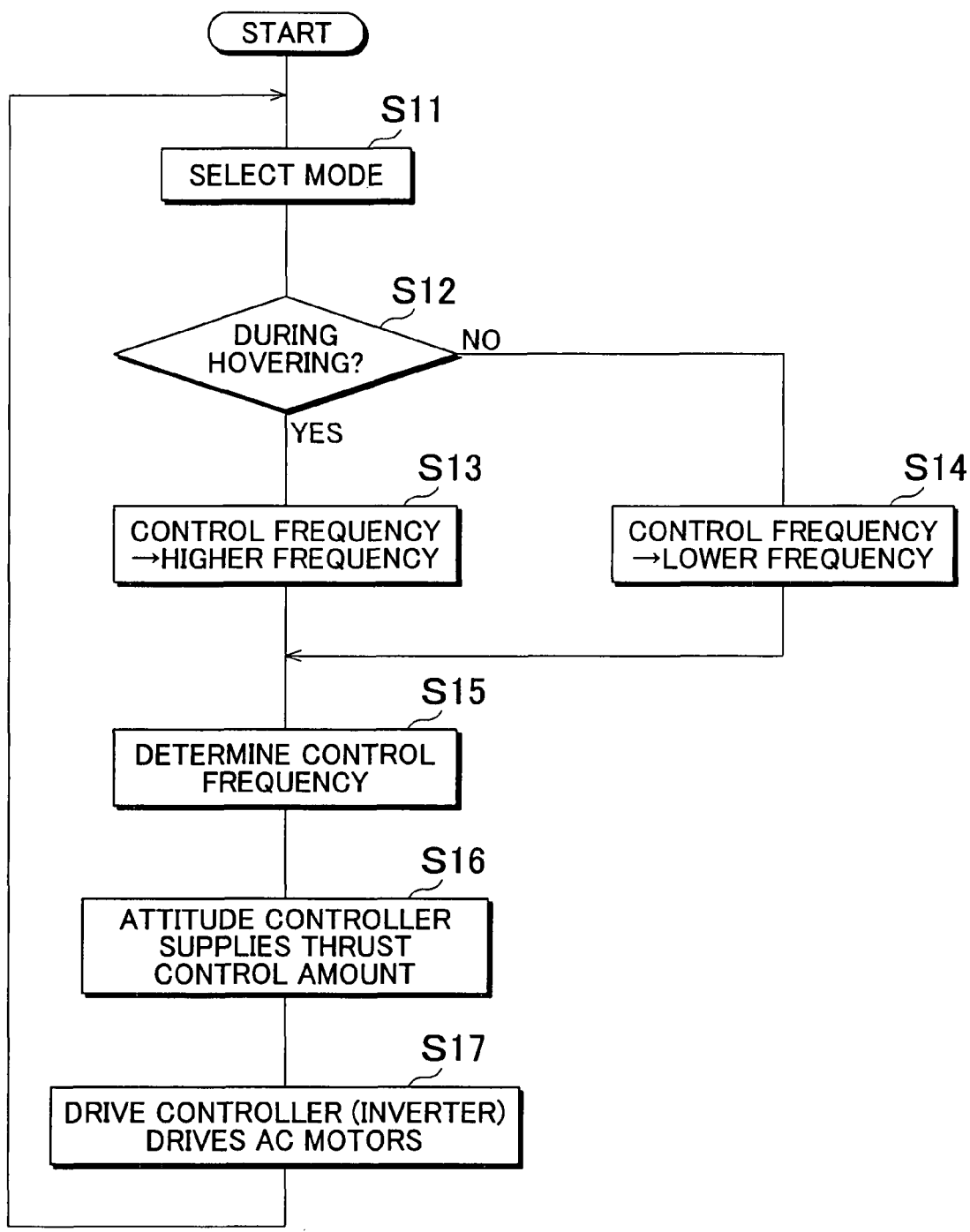
FIG. 2 is a flowchart showing a control procedure of the vertical take-off and landing aircraft in accordance with the embodiment of the present invention.

The operation of the VTOL aircraft of this embodiment will now be described. FIG. 2 is a flowchart showing a control procedure of the VTOL aircraft in accordance with the embodiment of the present invention, and FIG. 3 is a diagram showing the operation, from take-off to landing, of the VTOL aircraft in accordance with the embodiment of the present invention.

As shown in FIG. 2, first, the flight mode switch 8 (S11) is used to select the flight mode. If the VTOL craft body 1 is in either of a take-off area I and a landing area III shown in FIG. 3, the VTOL craft body 1 is hovering (in the state where the speed component parallel to the ground surface G is equal to or smaller than the speed component perpendicular to the ground surface G, or in the stationary state in air), and therefore the attitude controller 7 switches the control frequency of the drive controller 4 to a higher one (for example, to 800 Hz) (S12, S13).

On the other hand, if the VTOL craft body 1 is in a level flying area II shown in FIG. 3, the VTOL craft body 1 is flying (in the state where the speed component parallel to the ground surface G is larger than the speed component perpendicular to the ground surface G), and therefore the attitude controller 7 switches the control frequency of the drive controller 4 to a lower one (S12, S14). In this state, as the magnitude of crosswinds, that is, the amount of air that comes from sides of the VTOL craft body 1, is smaller, the attitude controller 7 switches the control frequency of the drive controller 4 to a lower one (for example, to 400 Hz).

After determining the control frequency (S15), the attitude controller 7 supplies the appropriate thrust control amount to the drive controller 4 (S16). The drive controller 4 supplies the AC motors 3 with three-phase AC at the control frequency determined by the attitude controller 7 according to the thrust control amount from the attitude controller 7 (S17).

In the operation of the VTOL aircraft of this embodiment described above, the drive controller 4 reduces the control frequency of the three-phase AC that is applied to the AC motors 3 to reduce the control resolution when a shift is made from the vertical flight mode to the horizontal flight mode, in which the control amount to correct the external forces is smaller. Therefore, it is possible to reduce the power loss in the controller and thus the power consumption compared to conventional VTOL aircraft, in which the control resolution is always constant.

Figure 4A:
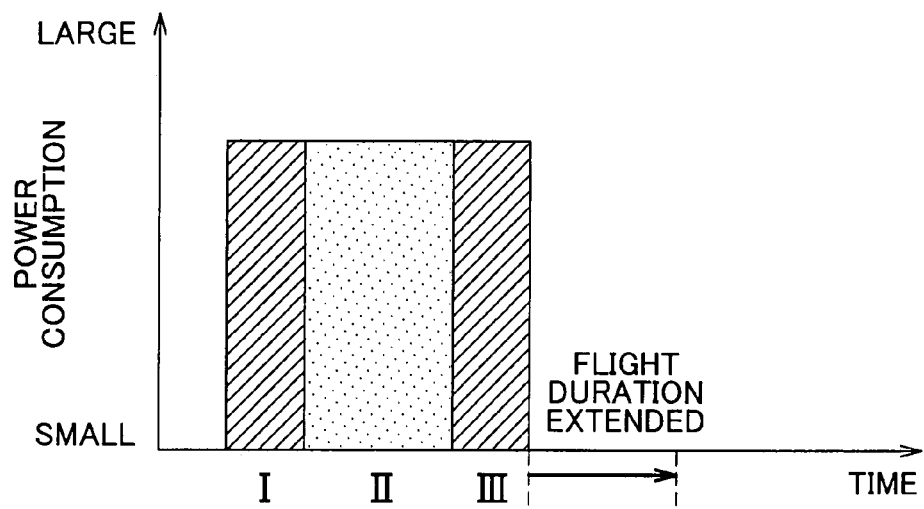
FIGS. 4A and 4B are each a graph showing the amount of electricity consumed by the vertical take-off and landing aircraft.
Figure 4B:
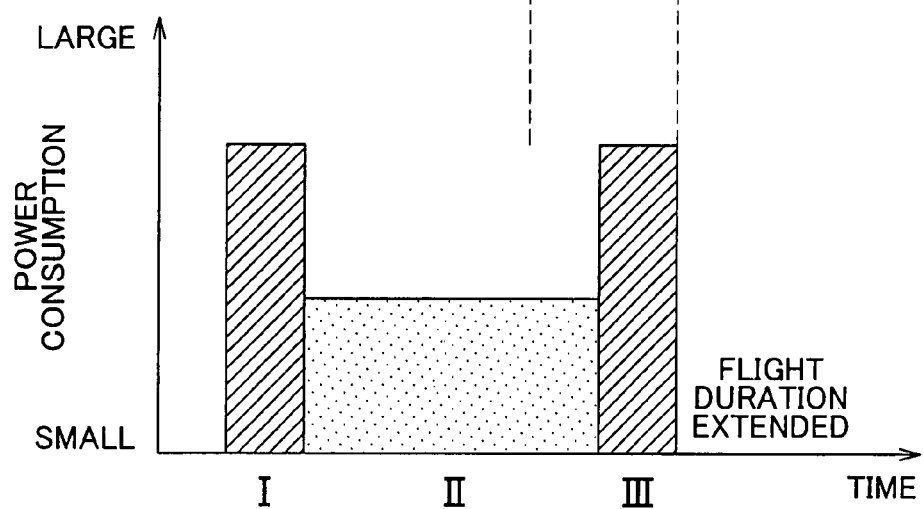

Specifically, if the control frequency of AC to be applied to the motors is constant, the amount of electricity consumed by the controller, such as an inverter, will also be constant, as shown in FIG. 4A. On the other hand, in this embodiment, the control frequency of three-phase AC that is applied to the AC motors 3 is increased in the take-off area I and the landing area III, and reduced in the level flight area II, as shown in FIG. 4B. As a result, the control response of the AC motors 3 is increased during hovering in the take-off area I and the landing area III, which improves the operation performance and secures operability required for take-off and landing. In addition, the reduced control frequency in the level flight area II in turn reduces the loss in the drive controller 4 and thus the power consumption. Because there are fewer external disturbances during level flight than during hovering, the control response during level flight does not need to be as fast as that during hovering, and thus the control frequency may be reduced. Consequently, the VTOL aircraft of this embodiment can support extended flight duration while ensuring the required control response and reducing the power consumption.

In this embodiment, in particular, it is possible to ensure the required control response and to reduce the power consumption in the level flight area II as well, by reducing the control frequency as the magnitude of crosswinds decreases.

Figure 5:
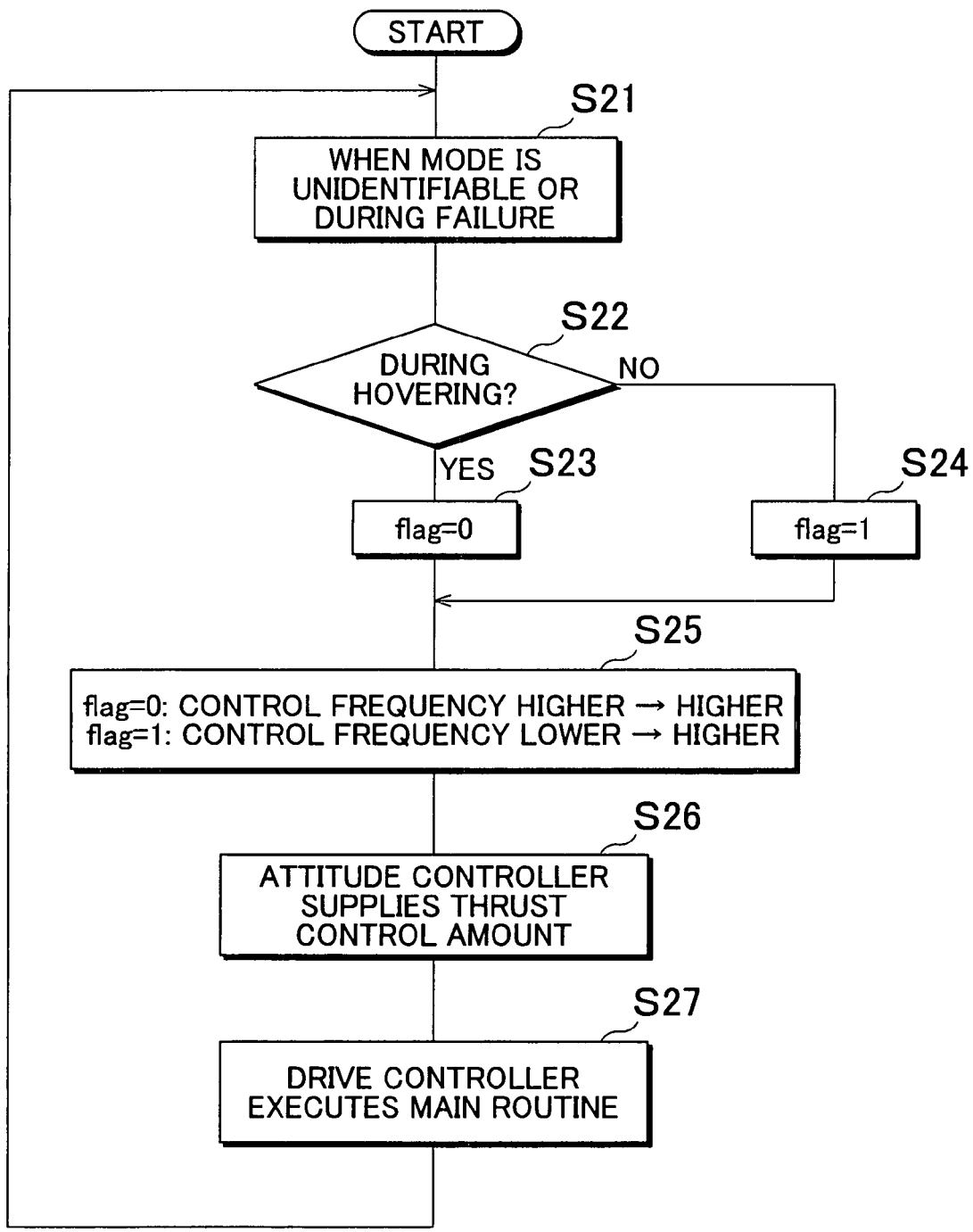
FIG. 5 is a flowchart showing a control procedure during a malfunction in some component.
Figure 6:
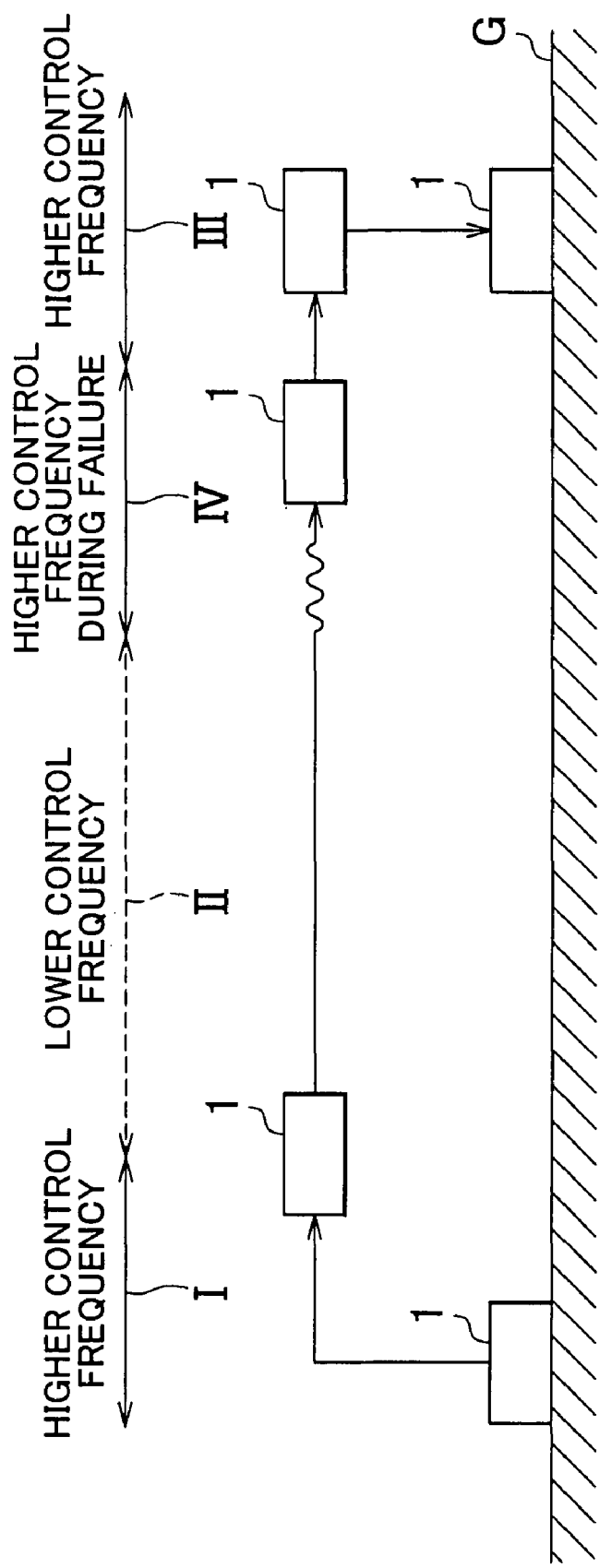
FIG. 6 is a diagram showing the operation at the occurrence of a malfunction in some component.
Figure 7:
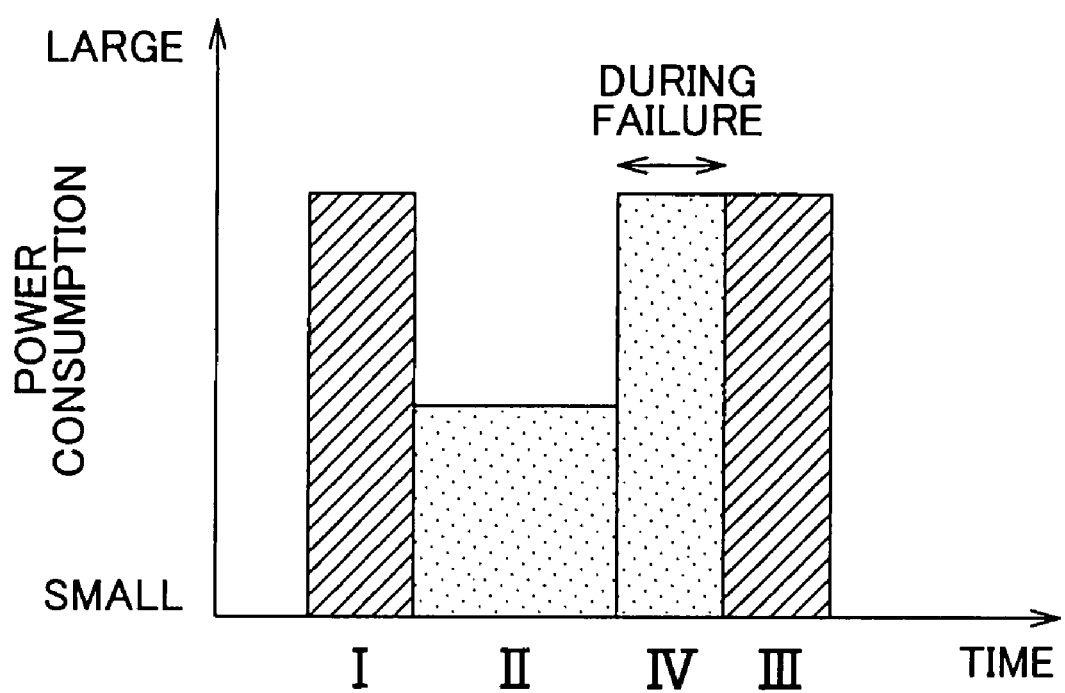
FIG. 7 is a graph showing the amount of electricity consumed by the vertical take-off and landing aircraft.

There may be a case where devices provided in the craft body of the VTOL aircraft do not function properly. The following describes the operation of the VTOL aircraft in the event of such malfunction. FIG. 5 is a flowchart showing a control procedure when a malfunction occurs, and FIG. 6 is a diagram showing the operation of the VTOL aircraft when a malfunction occurs.

As shown in FIG. 5, if the attitude controller 7 cannot detect the flight mode switching signal from the flight mode switch 8 and thus cannot identify the current flight mode, or if the attitude controller 7 has detected that a device provided in the VTOL craft body 1 has malfunctioned (S21), based on the information from the in-craft sensor 10, the attitude controller 7 detects based on the information from the in-craft sensor 10 whether the VTOL craft body 1 is hovering (S22). In this case, if the VTOL craft body 1 is hovering, flag=0 is set (S23). On the other hand, if the VTOL craft body 1 is flying in the level flight area II and not hovering, as shown in FIG. 6, flag=1 is set (S24). In this case, the attitude controller 7 indicates to the operator via the instrument panel 11 that a malfunction has occurred.

If flag=0 is set, the VTOL craft body 1 is hovering and has been flying at a higher control frequency, and therefore the attitude controller 7 maintains the higher control frequency. On the other hand, if flag=1 is set, the VTOL craft body 1 is not hovering but has been flying at a lower control frequency, and therefore the attitude controller 7 switches the lower control frequency to a higher control frequency (S25).

After determining the control frequency (S25), the attitude controller 7 supplies the appropriate thrust control amount to the drive controller 4 (S26). The drive controller 4 supplies the AC motors 3 with three-phase AC at the control frequency determined by the attitude controller 7 according to the thrust control amount from the attitude controller 7 (S27).

In the operation of the VTOL aircraft of the embodiment described above, the drive controller 4 assumes that the flight mode has been switched from the horizontal flight mode to the vertical flight mode when it is unidentifiable to which of the horizontal flight mode and the vertical flight mode switching has been made, or when any device provided in the VTOL craft body 1 is malfunctioning, to increase the control frequency of the three-phase AC to be applied to the AC motors 3 compared to that during the horizontal flight mode. Therefore, preparation can be made for emergency landing or the like, for which a faster control response is required, at the time of such a malfunction.

Specifically, when it is unidentifiable to which of the horizontal flight mode and the vertical flight mode switching has been made, or when any device provided in the VTOL craft body 1 has a functional defect, emergency operations for emergency landing or the like may be required. In such a case, the control frequency is temporarily increased to in turn increase the control response of the AC motors 3 as indicated by the failure area IV in FIG. 6, which improves the operation performance and secures operability required for emergency landing, for example. On the other hand, the reduced control frequency in the level flight area II, where the required control response is comparatively slow, in turn reduces the loss in the drive controller 4 and thus the power consumption, and consequently extends the flight duration.

An example embodiment of the present invention has been described above. The present invention is not limited to the above embodiment, and may be modified in various ways.

What is claimed is:

1. A vertical take-off and landing aircraft comprising:
   a fan for propelling the vertical take-off and landing aircraft;

a driving device for electrically driving the fan; and
a control device for controlling the driving device adaptively to an external force, wherein:
the control device reduces a control resolution of a control amount that is applied to the driving device as the control amount to correct the external force decreases;
the control device reduces the control resolution of the control amount that is applied to the driving device as a speed component perpendicular to a ground surface is small relative to a speed component parallel to the ground surface;
the control device is selectively operable in a horizontal flight control mode to be selected when the speed component parallel to the ground surface is larger than the speed component perpendicular to the ground surface, or a vertical flight control mode to be selected when the speed component parallel to the ground surface is equal to or smaller than the speed component perpendicular to the ground surface or to be selected when the aircraft is stationary in air;
when the flight control mode is switched from the vertical flight control mode to the horizontal flight control mode, the control device reduces the control resolution of the control amount to be applied to the driving device compared to that in the vertical flight control mode;
when the flight control mode is switched from the horizontal flight control mode to the vertical flight control mode, the control device increases the control resolution of the control amount to be applied to the driving device compared to that in the horizontal flight control mode; and
when it is unidentifiable to which of the horizontal flight control mode and the vertical flight control mode switching has been made, the control device assumes that switching has been made from the horizontal flight control mode to the vertical flight control mode to increase the control resolution of the control amount applied to the driving device compared to that in the horizontal flight control mode.

2. The vertical take-off and landing aircraft according to claim 1, wherein:
when the speed component parallel to the ground surface is equal to or larger than the speed component perpendicular to the ground surface, the control device reduces the control resolution of the control amount to be applied to the driving device as an amount of air that comes from sides of the craft body is smaller.

3. The vertical take-off and landing aircraft according to claim 1, wherein:
the control resolution of the control amount that is applied to the driving device by the control device is a control frequency of the control amount to be applied to the driving device.

4. A vertical take-off and landing aircraft comprising:
a fan for propelling the vertical take-off and landing aircraft;
a driving device for electrically driving the fan;
a control device for controlling the driving device adaptively to an external force, wherein:
the control device reduces a control resolution of a control amount that is applied to the driving device as the control amount to correct the external force decreases;
the control device reduces the control resolution of the control amount that is applied to the driving device as a speed component perpendicular to a ground surface is small relative to a speed component parallel to the ground surface;
the control device is selectively operable in a horizontal flight control mode to be selected when the speed component parallel to the ground surface is larger than the speed component perpendicular to the ground surface, or a vertical flight control mode to be selected when the speed component parallel to the ground surface is equal to or smaller than the speed component perpendicular to the ground surface or to be selected when the aircraft is stationary in air;
when the flight control mode is switched from the vertical flight control mode to the horizontal flight control mode, the control device reduces the control resolution of the control amount to be applied to the driving device compared to that in the vertical flight control mode;
when the flight control mode is switched from the horizontal flight control mode to the vertical flight control mode, the control device increases the control resolution of the control amount to be applied to the driving device compared to that in the horizontal flight control mode; and
when a device provided in a craft body malfunctions, the control device assumes that switching has been made from the horizontal flight control mode to the vertical flight control mode to increase the control resolution of the control amount applied to the driving device compared to that in the horizontal flight control mode.

5. A vertical take-off and landing aircraft control method comprising:
identifying an external force that acts on a vertical take-off and landing aircraft;
determining a control amount adaptively in response to the external force; and
controlling an electric fan for propelling the vertical take-off and landing aircraft based on the control amount, wherein:
as the control amount determined adaptively in response to the external force is reduced, a control resolution of the control amount is also reduced;
as a speed component perpendicular to a ground surface is small relative to a speed component parallel to the ground surface, the control resolution of the control amount is reduced;
when the speed component parallel to the ground surface is larger than the speed component perpendicular to the ground surface, a horizontal flight mode is selected;
when the speed component parallel to the ground surface is equal to or smaller than the speed component perpendicular to the ground surface or when the aircraft is stationary in air, a vertical flight control mode is selected;
when the flight control mode is switched from the vertical flight control mode to the horizontal flight control mode, the control resolution of the control amount is reduced compared to that in the vertical flight control mode;
when the flight control mode is switched from the horizontal flight control mode to the vertical flight control mode, the control resolution of the control amount is increased compared to that in the horizontal flight control mode; and
when it is unidentifiable to which of the horizontal flight control mode and the vertical flight control mode switching has been made, switching made from the horizontal flight control mode to the vertical flight control mode is assumed and the control resolution of the control amount is increased compared to that in the horizontal flight control mode.

* * * * *